United States Patent
Hergott et al.

(10) Patent No.: US 6,669,545 B1
(45) Date of Patent: Dec. 30, 2003

(54) METHOD AND MEANS FOR STUFFING NATURAL CASINGS WITH A FOOD EMULSION

(75) Inventors: Steven P. Hergott, Des Moines, IA (US); David S. Hamblin, Norwalk, IA (US); Michael J. Hardy, West Des Moines, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 10/268,853

(22) Filed: Oct. 10, 2002

Related U.S. Application Data (63) Continuation-in-part of application No. 10/226,826, filed on Aug. 23, 2002, now Pat. No. 6,585,580.

(51) Int. Cl.[7] ............................................. A22C 11/00
(52) U.S. Cl. .......................................................... 452/33
(58) Field of Search ............................. 452/30, 33, 35, 452/36, 39, 45

(56) References Cited

U.S. PATENT DOCUMENTS

| | | | | |
|---|---|---|---|---|
| 1,395,967 A | * | 11/1921 | Merli et al. ................... 452/42 |
| 3,195,176 A | * | 7/1965 | Washburn ..................... 452/33 |
| 3,253,297 A | * | 5/1966 | Nuckles ....................... 452/31 |
| 3,805,329 A | | 4/1974 | Kollross | |
| 3,805,480 A | * | 4/1974 | Cherio et al. .................. 53/64 |
| 4,112,546 A | | 9/1978 | Muller | |
| 4,437,209 A | * | 3/1984 | Duroyon ...................... 452/32 |
| 5,273,482 A | * | 12/1993 | Beckman et al. ............. 452/39 |
| 5,352,151 A | * | 10/1994 | Piereder ....................... 452/32 |
| 5,813,906 A | * | 9/1998 | Phillips ........................ 452/36 |
| 5,830,050 A | * | 11/1998 | Nakamura et al. ............ 452/31 |
| 6,066,035 A | | 5/2000 | Hergott et al. | |
| 6,139,416 A | | 10/2000 | Toepfer | |
| 6,524,177 B2 | * | 2/2003 | Bolzacchini ................. 452/22 |

FOREIGN PATENT DOCUMENTS

| | | |
|---|---|---|
| DE | 1136604 | 9/1962 |
| FR | 2780246 | 12/1999 |

* cited by examiner

*Primary Examiner*—Thomas Price (57) ABSTRACT

A controlled follower on a stuffing tube engages and causes a natural casing thereon to be longitudinally moved toward the discharge end of a stuffing tube to be filled with emulsion, twisted and formed into links. The follower is controlled by a sensor, in conjunction with a controller, and in instances, influenced by a sensor, to have a controlled movement of the casing along the stuffing tube.

16 Claims, 8 Drawing Sheets

METHOD AND MEANS FOR STUFFING NATURAL CASINGS WITH A FOOD EMULSION

CROSS REFERENCE TO RELATED APPLICATION

This application is a continuation-in-part of Ser. No. 10/226,826, filed Aug. 23, 2002, now U.S. Pat. No. 6,585,580.

AREA OF TECHNOLOGY

This invention deals with stuffing an edible emulsion, usually a sausage emulsion, into an elongated casing, and commonly a natural casing made from the intestines of sheep or other animals. While the term sausage emulsion is used herein, it is understood that any pump-able product is encompassed by that expression.

BACKGROUND OF THE INVENTION

Sausages have been traditionally made by filling the natural intestines of sheep or other animals, with a meat mixture whereupon the filled natural casing was formed into links for cooking. In more modern times, sausages are predominantly made by introducing an emulsion into an artificial casing, which encases the sausage material through linking and preliminary cooking. Machines for making sausages with artificial casings have a high volume capability (up to 30,000 sausages per hour). Efforts have been made to use these high-speed machines with natural casings. However, because of the nature of the natural casings, modern sausage encasing machines have not achieved the volume and capacity with natural casings as they do with artificial casings.

It is therefore a principal object of this invention to provide a controlled follower for a sausage making machine that will effectively control the movement of a natural casing along and off of a stuffing tube as the casing is being filled with emulsion from the discharge end of the stuffing tube.

These and other objects will be apparent to those skilled in the art.

SUMMARY OF THE INVENTION

A controlled follower on a stuffing tube engages and causes a natural casing thereon to be longitudinally moved toward the discharge end of a stuffing tube to be filled with emulsion, twisted and formed into links. The follower is controlled by a sensor, in conjunction with a controller, and in instances, influenced by a sensor, to have a controlled movement of the casing along the stuffing tube.

DESCRIPTION OF THE EMBODIMENTS OF THE INVENTION

The term "emulsion" as used herein includes meat or any other edible substance.

Figure 1:
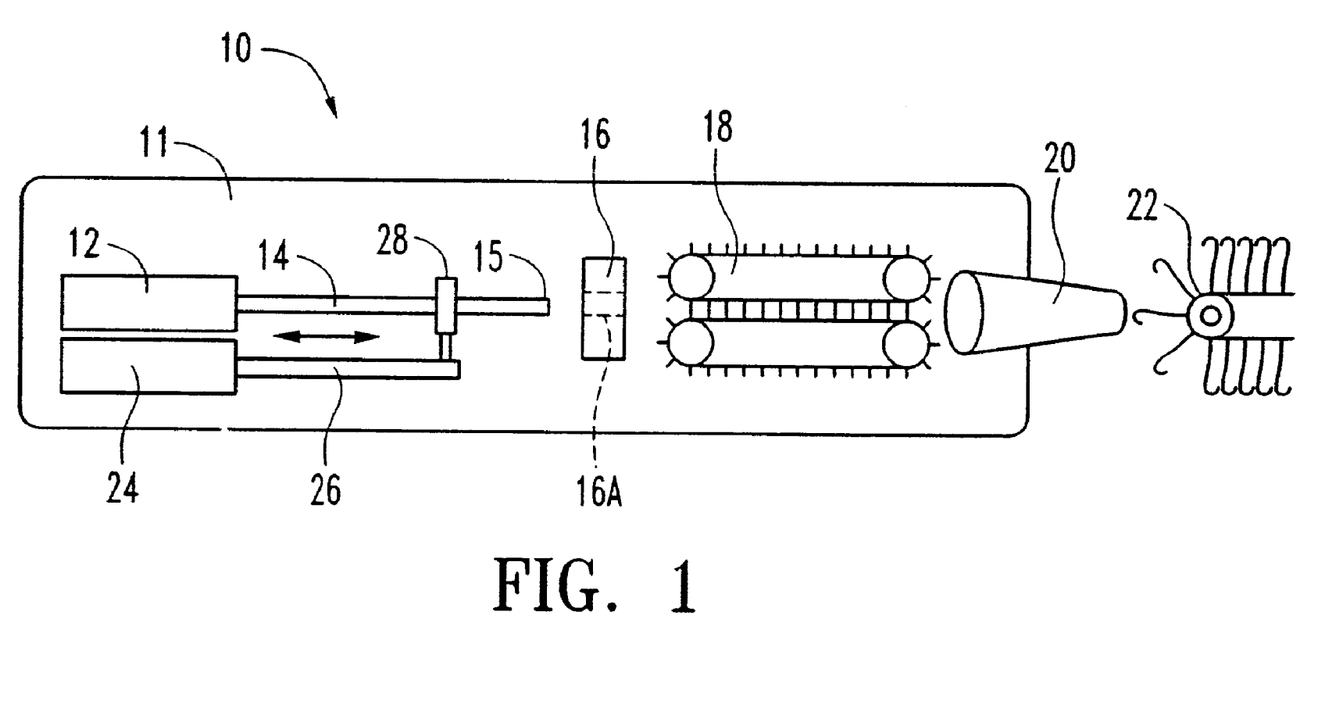
FIG. 1 is a schematic plan view of the sausage making machine of this invention.

With reference to FIG. 1, a conventional sausage making machine 10 has a frame 11, a pump 12 connected to a source of emulsion (not shown), a slidable stuffing tube 14 having a discharge end 15, a twisting mechanism 16, a linking mechanism 18, a discharge horn 20, and a conveyor 22. Twisting mechanism 16 includes a center bore 16A and a conventional chuck 17. (FIG. 2A)

Figure 2:
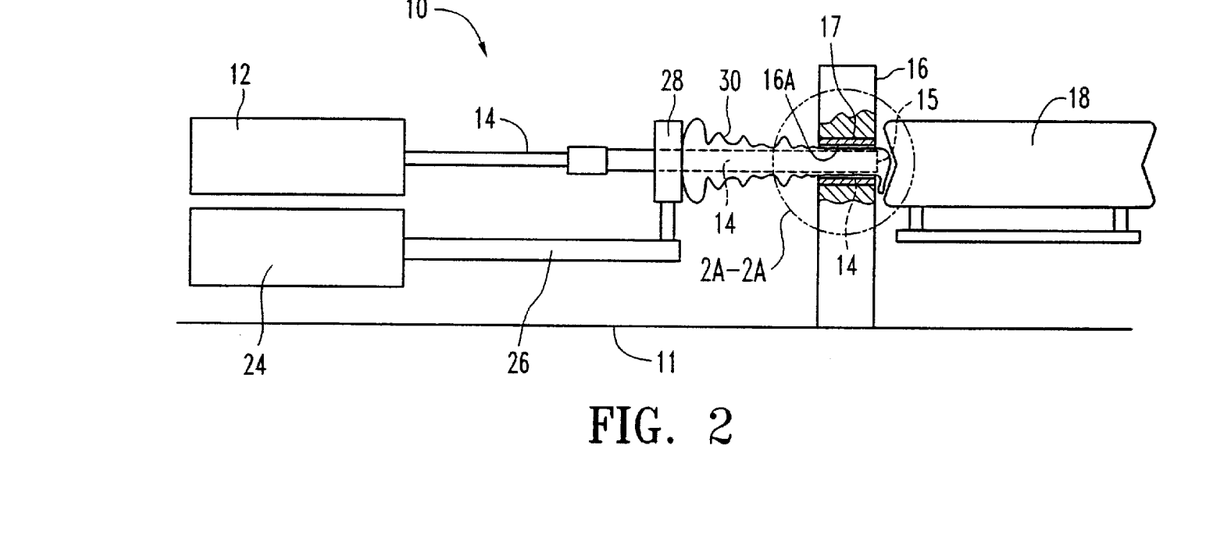
FIG. 2 is a schematic elevational view of the first embodiment of this invention.
Figure 2A:
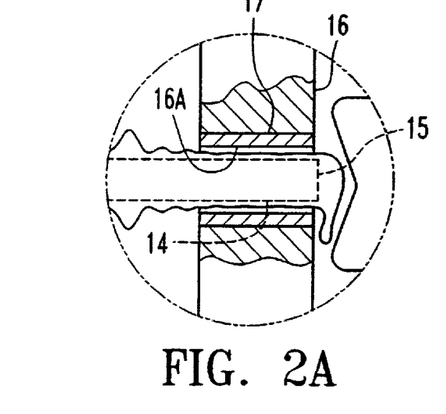
FIG. 2A is an enlarged partial sectional view taken on lie 2A—2A of FIG. 2.

The first embodiment of this invention is shown in FIGS. 2 and 2A. A controlled cylinder 24, preferably pneumatic, has a conventional piston rod 26 extending forwardly therefrom with a follower 28 on its forward end, which slidably embraces the stuffing tube 14. A natural casing 30 is mounted on the stuffing tube 14 forwardly of follower 28 and typically extends through the bore 16A in the twister within a conventional chuck 17 mounted in bore 16A. The forward end of the casing extends through the forward or discharge end 15 of the stuffing tube (FIGS. 2 and 2A).

The controlled cylinder 24 can be of a pneumatic, hydraulic or mechanical style. It can extend at either a continuous rate, a pulsing rate of intermittent forward, or a forward and stop sequence. The cylinder can be controlled by a controller (not shown). It is programmed to move forwardly on stuffing tube 14 to advance the natural casing 30 into the twisting mechanism 16 as described heretofore.

Conventionally, the pump 12 extrudes emulsion into the tube 14 and out the discharge end 15 to fill the casing 30 as it progresses through the twister 16. The filled casing is linked by linkers 18 and is conventionally fed into the twister 16, and thence into the discharge horn 20 onto the conveyor 22 in linked condition.

Figure 3:
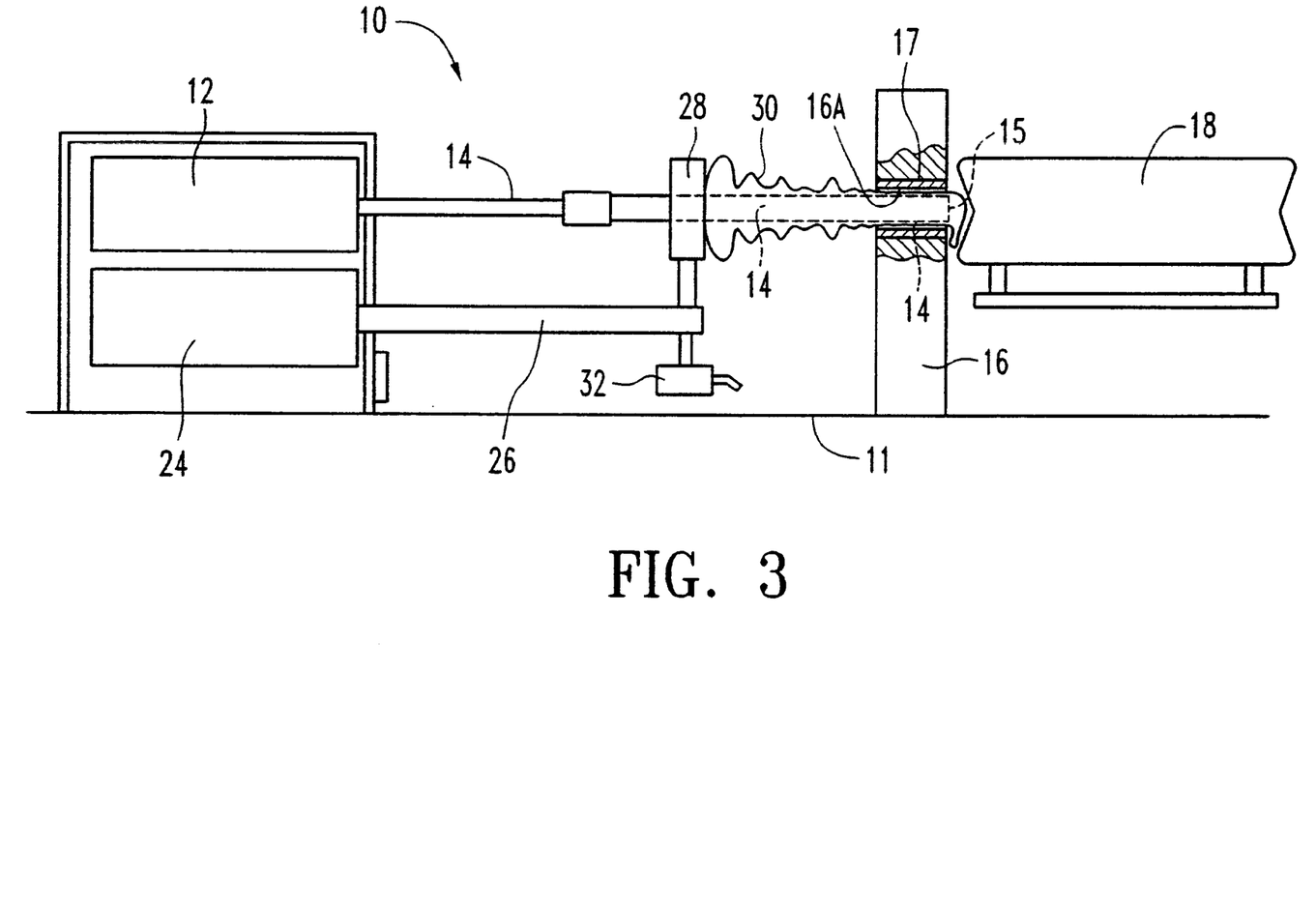
FIG. 3 is a schematic side elevational view of a second embodiment of this invention.

The second embodiment of the invention is shown in FIG. 3 which is similar to that of FIG. 2 except that a sensor 32 is mounted on the forward end of piston 26 and provides information to the controller which is used to indicate the position of the follower 28. The use of the sensor 32 is the essence of the second embodiment of the invention. The sensor 32 can be of a transducer, ultrasonic, or optical sensing mechanism.

Figure 4:
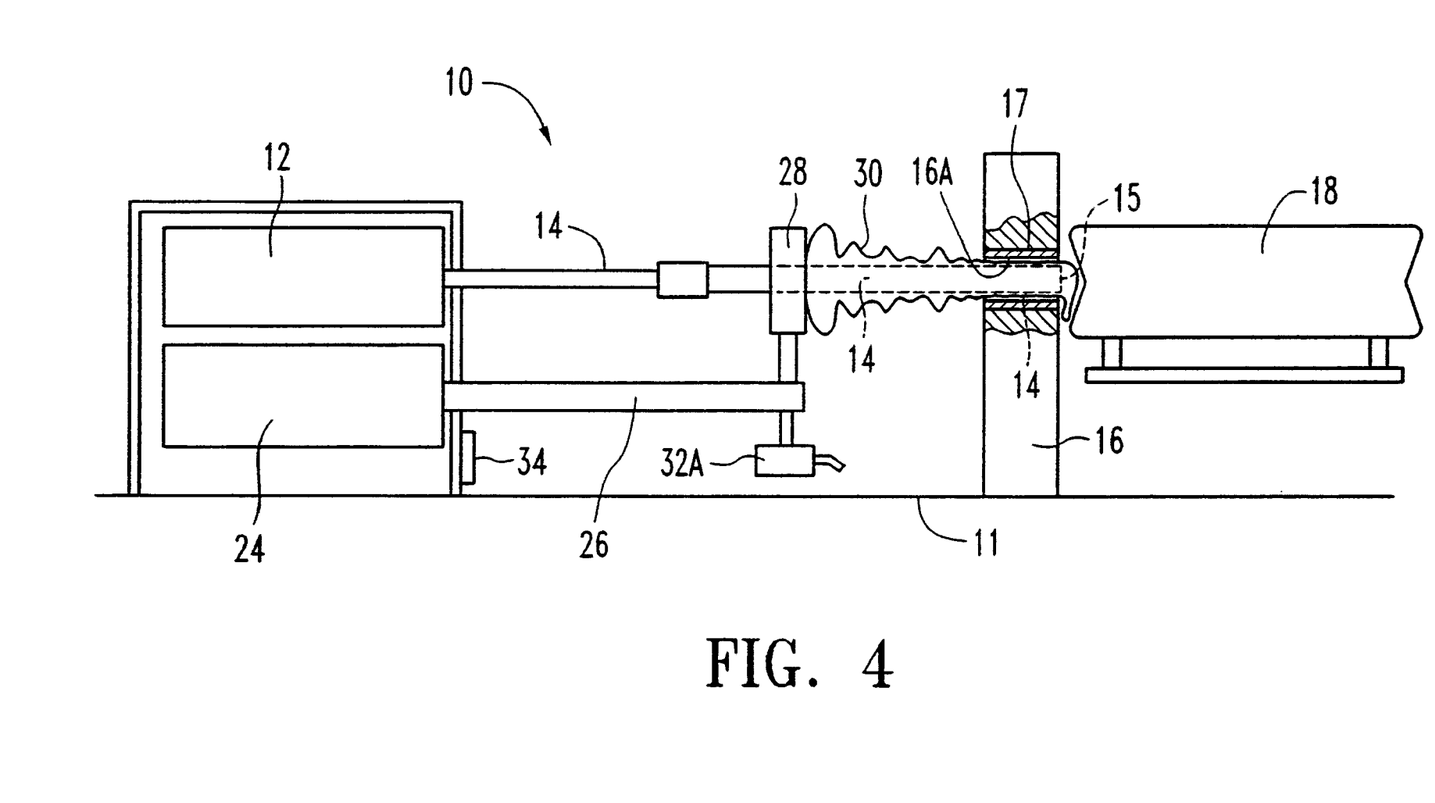
FIG. 4 is a schematic side elevational view of a third embodiment of this invention.

A third embodiment of the invention in FIG. 4 is similar to that of FIG. 3 (the second embodiment) except that a receiving pad 34 is located on the frame 12 in alignment with the sensor 32A. The sensor 32A detects the receiving pad 34 and sends a signal to the PLC/computer (controller) which calculates the distance from the receiver pad 34 and thus provides a location of the follower 28. This information then enables the controller to control the motion of the cylinder 24. The essence of the third embodiment of the invention shown in FIG. 4 is the co-action between the receiving pad 34 and the modified sensor 32A. It is preferred that cylinder 24 be an air cylinder in this embodiment. The position of the receiving pad 34 and sensor 32A could be interchanged. (For example, the sensor could be mounted on the frame).

Figure 5:
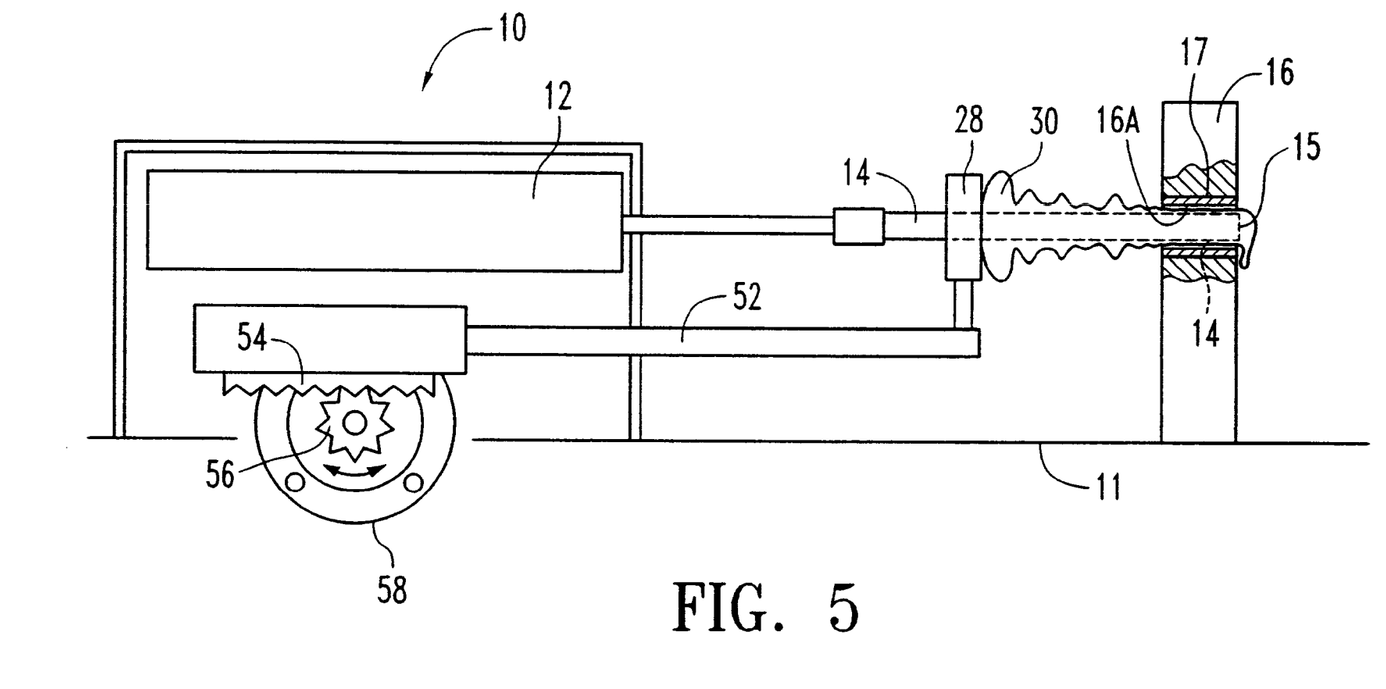
FIG. 5 is a schematic elevational view of a fourth embodiment of this invention.

FIG. 5 shows the fourth embodiment of this invention, which utilizes a horizontal shaft 52, connected to the follower 28. The shaft 52 is connected to rack 54 which meshes with pinion 56 attached to servomotor 58. The motor meshes with pinion 56 in either a forward or rearward direction. The motion of the shaft 52 controls the motion of the follower 28. The motion of the shaft 52 is controlled by the interaction of the rack 54 and the pinion 56 as described above. The rack is mounted to the shaft 52 and the pinion 56 is mounted to the servomotor 58 as described above. The servomotor turns the pinion, which in turn moves the rack backward and forward. The servomotor is controlled by the PLC/computer (controller).

Figure 6:
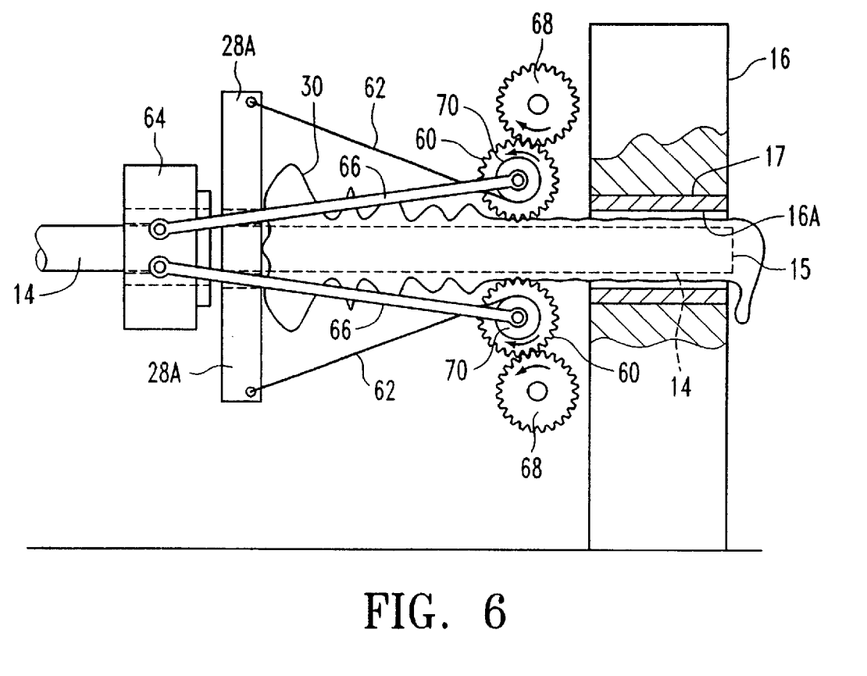
FIG. 6 is a schematic side elevational view of a fifth embodiment of this invention.
Figure 7:
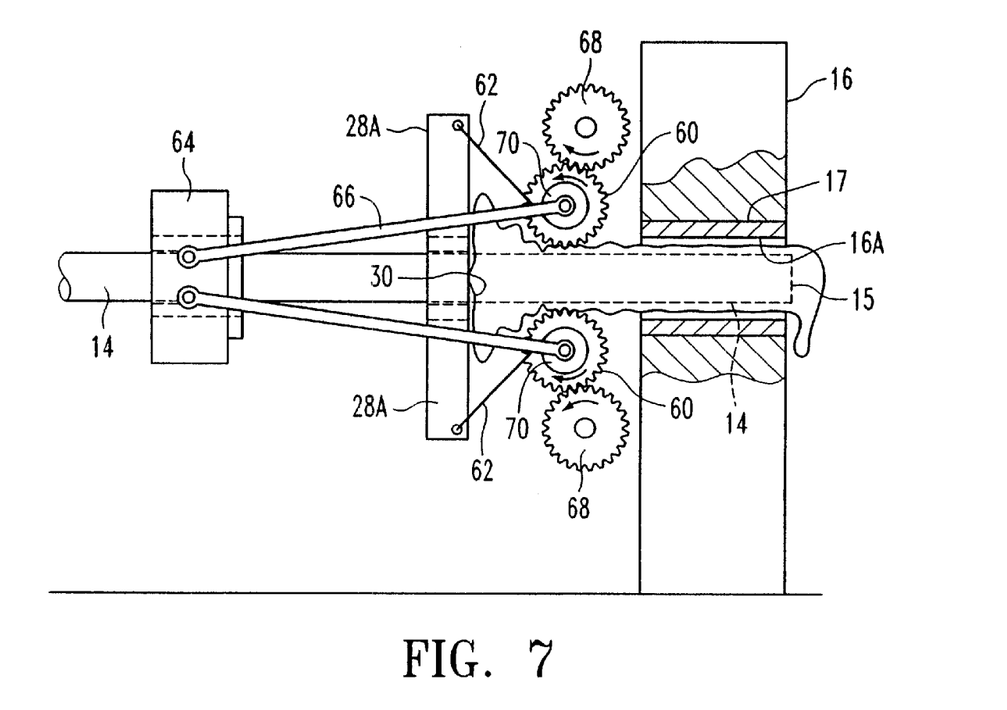
FIG. 7 is a view similar to that of FIG. 6 but shows the components in a further stage of operation.
Figure 8:
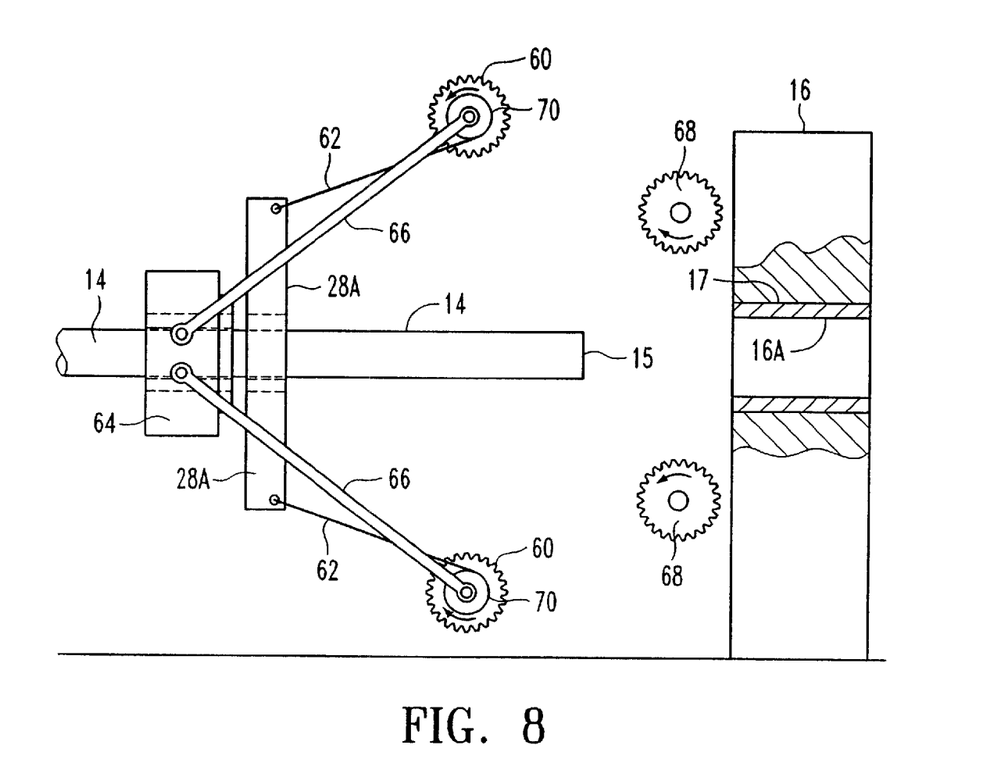
FIG. 8 is a schematic side elevational view of the device of FIGS. 6 and 7 in a further operational position.

The fifth embodiment of the invention is shown in FIGS. 6, 7 and 8. In this embodiment, feed rollers 60 with cable 62 threaded therearound are pivotally mounted to pivot base 64 by pivot arm 66. Drive wheel 68 connected to a suitable source of rotatational power (not shown) are meshed with the teeth on feed rollers 60 to provide rotational power thereto. The cables 62 have a rearward end secured to the follower 28A and a forward end connected to the drum 70 on feed roller 60.

With reference to FIG. 7, the feed rollers 60 perform two functions. They assist in feeding the natural animal casing 30 into the twisting mechanism 16. Secondly, they draw the follower 28A toward the discharge end 15 of the stuffing tube 14 by winding the cables 62 around the drums 70 attached to the feed roller 60.

With reference to FIG. 8, once the natural casing 30 is completely removed from the stuffing tube 14, the tube retracts away from the twister 16 and the drive wheels 68. The follower 28A can be returned to the rearward or starting position which uncoils the cables 62 from the feed rollers 60. The pivot arms 66 are then pivoted away from the stuffing tube 14. This then allows for the installation of another natural casing 30.

It is therefore seen that this invention will achieve at least all of its stated objectives.

We claim:

1. A method of stuffing natural casings with emulsion comprising,
   placing a length of natural casing on an elongated end of an emulsion stuffing tube having a discharge end for extruding emulsion into the casing,
   providing a follower element behind the length of natural casing and in engagement therewith to move the casing forwardly on the stuffing tube wherein a position sensor is located on the forward end of the follower element and is connected to means for indicating the position of the follower element, and
   providing a powered follower arm for the follower element to assist in the movement of the casing forwardly on the stuffing tube.

2. The method of claim 1 wherein the follower arm is moved forwardly in one of the following group of movement modes: a continuous rate of movement; a variable rate or a pulsating rate of movement.

3. The method of claim 2 wherein the follower arm is moved forwardly by one of the following group of powered means: pneumatic, hydraulic, electrical or mechanical.

4. The method of claim 3 wherein the follower arm is controlled by a controller.

5. The method of claim 4 wherein the controller is a rack and pinion assembly connected to the follower element with the pinion of the rack and pinion assembly being connected to a reversible servo motor controlled by a controller.

6. The method of claim 1 wherein the sensor detects the distance that the follower element has moved longitudinally forwardly with respect to a point of beginning and transmits a signal to a power means and a controller to control the movement of the follower element.

7. A method of stuffing natural casings with emulsion, comprising the steps of,
   placing a length of a hollow natural casing on the end of an emulsion stuffing tube,
   providing a follower element behind the length of natural casing and in engagement therewith to move the casing forwardly on the stuffing tube,
   providing rotatably powered feed rollers on the casing to engage the casing to move the casing forwardly on the stuffing tube wherein the feed rollers are operatively connected by cables to the follower element to advance the follower element in a longitudinally forwardly direction as the feed rollers engage the casing to move the casing forwardly on the stuffing tube.

8. The method of claim 7 wherein the feed rollers are connected to the forward ends of pivot arms pivotally connected to a pivot base mounted rearwardly of the follower element.

9. The method of claim 8 wherein the feed rollers are mounted on elongated forwardly extending pivot arms and the follower element is withdrawn after the casing is removed from the stuffing tube to cause the pivot arms to pivot away from the stuffing tube to allow space for another casing to be placed on the stuffing tube.

10. The method of claim 7 wherein the cables are operatively connected to the feed rollers so that the cables are coiled on the feed rollers as they are rotated and as the follower element is drawn forwardly by the cables.

11. A machine for stuffing natural casings with sausage emulsion, comprising,
    a frame,
    an emulsion pump on the frame for pumping emulsion,
    a stuffing tube mounted on the frame and associated with the pump and having a rearward end and a discharge end for extruding emulsion into a casing slidably mounted on an outside surface of the tube,
    a follower element slidably mounted on the tube behind the casing to be in engagement with the casing to move the casing forwardly on the tube wherein a position sensor is located on the forward end of the follower element and is connected to means for indicating the position of the follower element,
    a follower arm attached to the follower element to assist in the movement of the follower,
    a power means associated with the follower arm for longitudinally moving the same.

12. The machine of claim 11 wherein the power means follows one of the following group of movement modes: a continuous rate of movement, a variable rate of movement or a pulsating rate of movement.

13. The machine of claim 11 wherein the sensor is capable of detecting the distance that the follower element has moved longitudinally forwardly with respect to a point of beginning and transmits a signal to a power means and a controller to control the movement of the follower element.

14. The machine of claim 11 wherein the follower arm is controlled by a controller.

15. A machine for stuffing natural casings with sausage emulsion, comprising,
    a frame,
    an emulsion pump on the frame for pumping meat emulsion, a stuffing tube mounted on the frame and associated with a stuffing tube on the frame and associated with the pump and having a forward end and a discharge end for extruding emulsion into a casing slidably mounted on an outside surface of the tube, a follower element slidably mounted on the tube behind the casing to be in engagement with the casing to move the casing forwardly on the tube, rotatably powered feed rollers on opposite sides of the casing to engage the casing to move the casing forwardly on the stuffing tube wherein the feed rollers are operatively connected by cables, the feed rollers are connected to the forward ends of pivot arms pivotally connected to a pivot base mounted rearwardly of the follower element and wherein the cables are operatively connected to the feed rollers so that the cables are coiled on the feed rollers as they are rotated and as the follower element is drawn forwardly by the cables.

16. The machine of claim 15 wherein the feed rollers are mounted on elongated forwardly extending pivot arms and the follower element is withdrawn after the casing is removed from the stuffing tube to cause the pivot arms to pivot away from the stuffing tube to allow space for another casing to be placed on the stuffing tube.

* * * * *